C. M. MOTTE.
COMBINED BONNET AND CAR BODY FOR AUTOMOBILE VEHICLES.
APPLICATION FILED JULY 22, 1918.

1,343,519.

Patented June 15, 1920.
3 SHEETS—SHEET 1.

C. M. MOTTE.
COMBINED BONNET AND CAR BODY FOR AUTOMOBILE VEHICLES.
APPLICATION FILED JULY 22, 1918.

1,343,519.

Patented June 15, 1920.
3 SHEETS—SHEET 2.

C. M. MOTTE.
COMBINED BONNET AND CAR BODY FOR AUTOMOBILE VEHICLES.
APPLICATION FILED JULY 22, 1918.

1,343,519.

Patented June 15, 1920.
3 SHEETS—SHEET 3.

UNITED STATES PATENT OFFICE.

CHARLES MARIUS MOTTE, OF PARIS, FRANCE, ASSIGNOR TO MRS. DELQUÉ, BORN MARIE AMELIE HABANS, AND CHARLES MARIUS MOTTE, BOTH OF PARIS, FRANCE.

COMBINED BONNET AND CAR-BODY FOR AUTOMOBILE-VEHICLES.

1,343,519.   Specification of Letters Patent.   Patented June 15, 1920.

Application filed July 22, 1918. Serial No. 246,111.

*To all whom it may concern:*

Be it known that I, CHARLES MARIUS MOTTE, of 53 Rue Secretan, Paris, France, have invented a Combined Bonnet and Car-Body for Automobile-Vehicles, of which the following is a clear, full, and exact description.

In automobile vehicles of the current types the radiator and the dash board are rigidly connected with the chassis or underframe, the radiator being secured to the longitudinal bearers by means of bolts and the dash board virtually integral with the car body, while the bonnet or hood covering the motor is alone detachable and easily dismountable.

In automobile vehicles this detachability of the bonnet alone is generally sufficient to insure the daily attention required by the motor, but when it is a question of inspecting or dismounting the steering gear, the clutch or the change-speed gear box, which are at present usually placed underneath the floor, it is necessary to dismantle the latter as well as the dash board, and sometimes the radiator, and in certain cases the car body, which involves a good deal of work, sometimes of rather a difficult nature, making it necessary to have recourse to skilled labor, and consequently burdensome.

The present invention relates to a combined bonnet and car body designed to remedy the defects pointed out above.

The combined bonnet and car body is essentially characterized by the fact that, the bonnet proper, covering the motor, comprises an extension so shaped as to constitute the fore part of the car body, the bonnet and its extension being mounted on two plates, which are fixed by means of bolts on to the longitudinal bearers of the underframe.

Owing to its special construction the combined bonnet and car body forms a casing covering not only the motor but also all the mechanical parts, the clutch, the change-speed gear box, the steering gear, and other mechanism.

The invention is furthermore characterized by the fact that the dash board of the underframe and the radiator are also mounted preferably on the fixing sole plates of the said combined bonnet and car body.

By means of this device the unit consisting of the bonnet proper, the car body, the dash board and the radiator constitute a group of elements, mounted on two fixing sole plates, all virtually integral with one another, and capable of being separated all at the same time from the underframe by merely unscrewing the bolts that retain on the latter the sole plates on which these elements are mounted.

This device offers therefore the double advantage of enabling these elements to be easily and quickly assembled and dismantled, and at the same time of enabling all parts of the motor, the clutch, the change-speed gear box, the steering gear and the various controls to be uncovered and made fully accessible without requiring any complicated work.

The accompanying drawing shows by way of example one constructional form of the present combined bonnet and car body.

Figure 1:
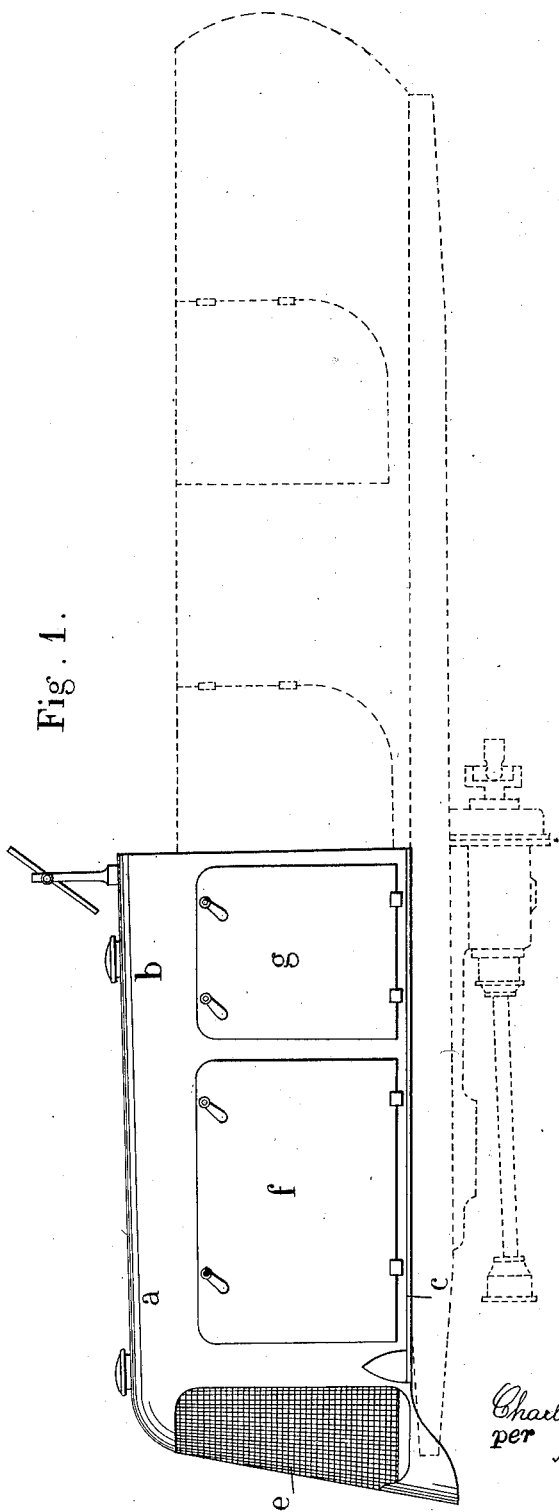
Figure 1 shows an elevation of the device mounted on the underframe of an automobile vehicle.
Figure 2:
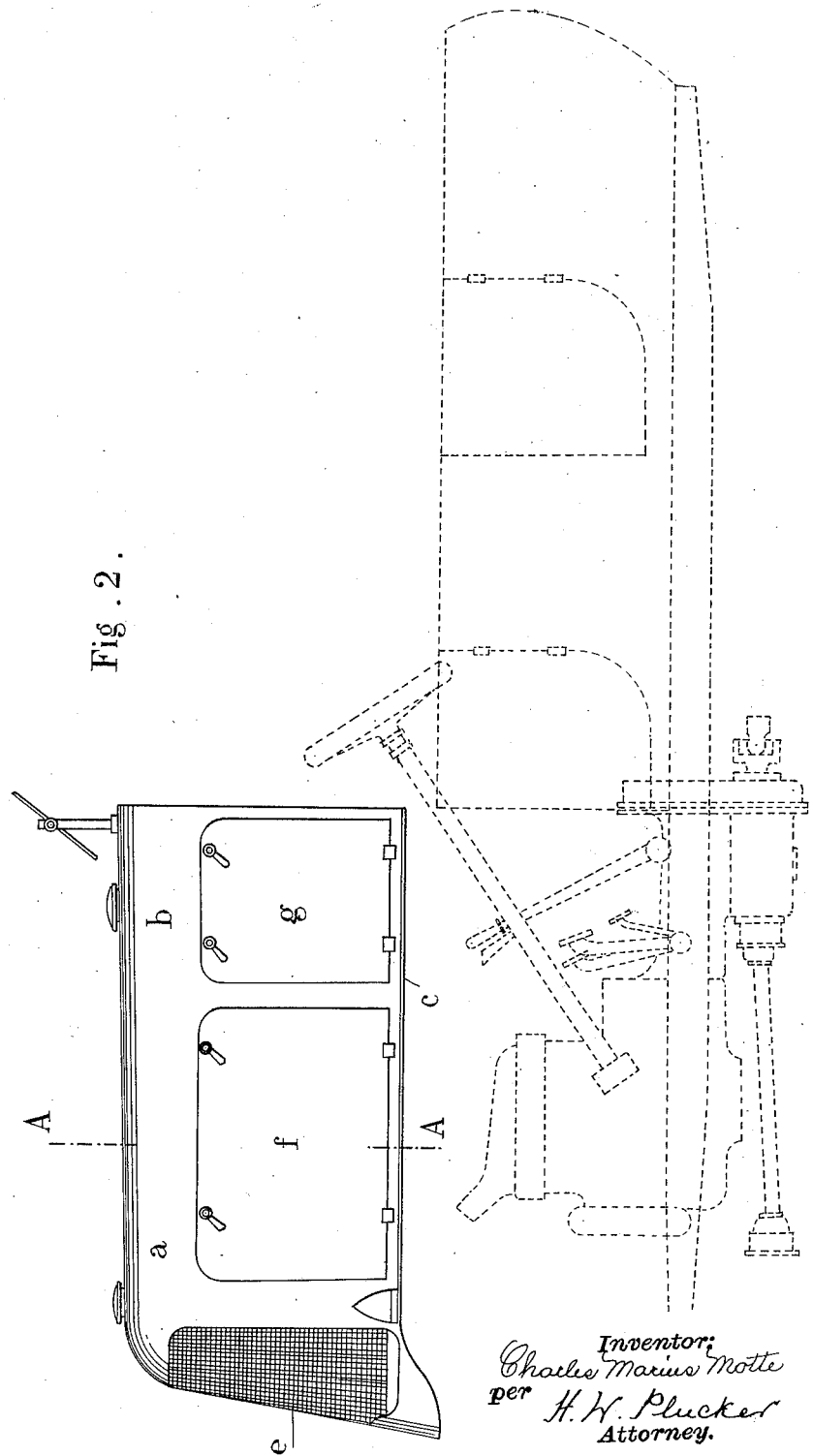
Fig. 2 shows an elevation of the device detached from the underframe.
Figure 3:
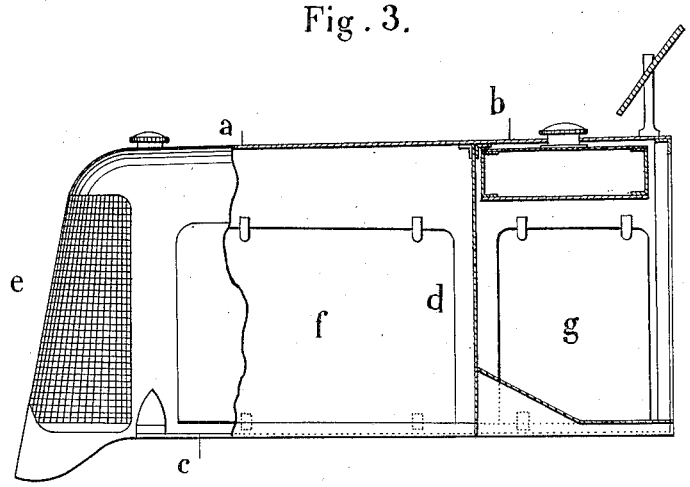
Fig. 3 shows a longitudinal section of the device.
Figure 4:
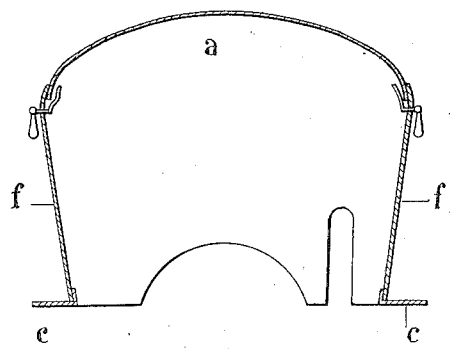
Fig. 4 is a cross section of the device on the line A—A of Fig. 2.

The present combined bonnet and car body arrangement comprises a bonnet *a* having an extension *b* so shaped as to constitute the fore part of the car body. The unit consisting of this bonnet *a* and its extension *b* is mounted on two sole plates *c* in which holes are made for the bolts that fix the combined bonnet and car body on to the longitudinal bearers of the underframe.

This combined bonnet and car body also comprises the dash board *d*, as well as the radiator *e*.

On the front of the car body *b* and on the dash board *d* are mounted the fuel tank, the wind screen and other accessories.

In the sides of the bonnet *a* and of the front of the car body *b* openings are formed, which are closed by means of doors *f*, *g*, permitting of access to the motor for the purpose of its daily overhauling.

The front of the car body *b*, carried by the present combined bonnet and car body, may be arranged in the same way as ordinary fixed car-body fronts of vehicles of the types at present in use, and may be applied whatever may be the shape of the body of the vehicle. It also has the advantage of enabling the car body to be easily changed, and of enabling for instance a closed car body to be substituted quickly for an open car body, and conversely.

By means of the present invention, the bonnet *a*, the car body front *b*, the dash board *d* and the radiator *e* mounted together on the sole plates *c*, constitute a whole, the assembling of which on the longitudinal members of the underframe and the dismantling thereof may be effected very quickly, without any difficulty, since all that is necessary is to screw up or unscrew the bolts that fix the sole plates *c* on to the longitudinal bearers of the underframe. Under these conditions the complete inspection of all the mechanical members or the repairing of any one of them may be effected very easily, since merely by unscrewing a few bolts the combined bonnet and car body may be removed and in this way all the mechanical parts, the motor, the clutch, the change-speed gear box, the steering gear, and other mechanism are exposed to view.

The present invention also has the advantage of bringing about a considerable economy in the construction of the vehicles, as this combined bonnet and car body can be constructed in sets independently of the underframe.

It will be understood that the form, dimensions and constructional details of the present invention may be modified according to the various uses to which it is to be applied without departing in any way from the principle of the invention.

Claims:

1. In an automobile vehicle, a removable unit independent of the automobile body, said unit comprising a bonnet for inclosing the engine and an extension of said bonnet integral therewith extending beyond the dash board, and sole plates connected to the lower edges of said bonnet and extension, said sole plates being adapted to rest on the underframe of the vehicle and extending rearwardly beyond the dash board.

2. In an automobile vehicle, a removable unit independent of the automobile body, said unit comprising a bonnet for inclosing the engine, a radiator rigidly connected to said bonnet, and an extension of said bonnet integral therewith extending beyond the dash board to a point at the rear thereof.

3. In an automobile vehicle, a removable unit independent of the automobile body, said unit comprising a bonnet for inclosing the engine, a radiator rigidly connected to the front part of said bonnet, a dash board rigidly connected to the rear part of said bonnet, at extension of said bonnet integral therewith extending beyond the dash board to a point at the rear thereof, and sole plates connected to the lower edges of said bonnet and extension and adapted to be fastened to the underframe of the vehicle.

4. In an automobile vehicle, the combination of a removable unit comprising a bonnet for inclosing the engine, a dash board rigidly connected to the rear part of said bonnet and an extension of said bonnet integral therewith and extending beyond the dash board to a vertical plane at the rear thereof, with an automobile body having its front end substantially flush with said plane.

The foregoing specification of my combined bonnet and car body for automobile vehicles, signed by me this 19th day of June, 1918.

CHARLES MARIUS MOTTE.

Witnesses:
 JOHN F. SIMONS,
 EMILE BERTRAND.